UNITED STATES PATENT OFFICE.

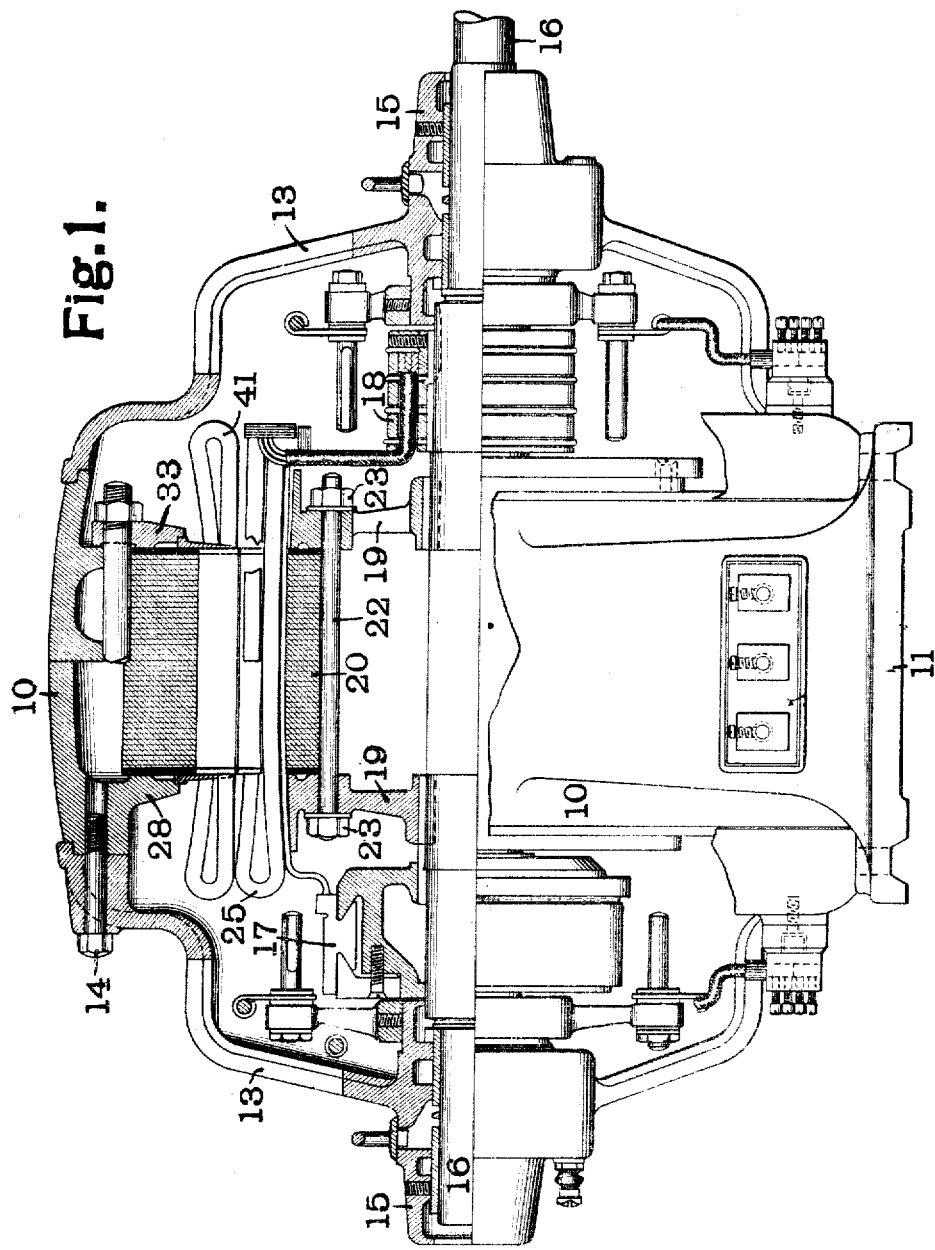

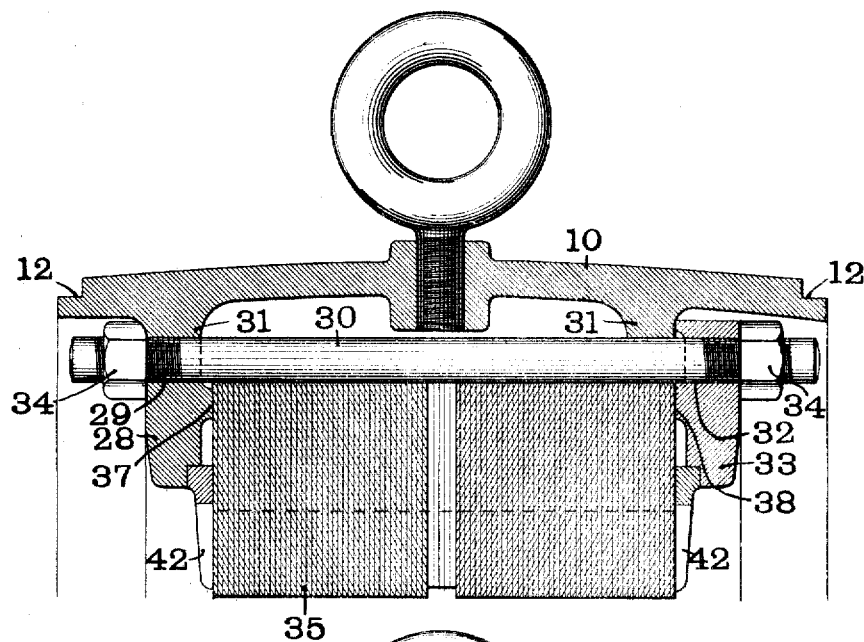
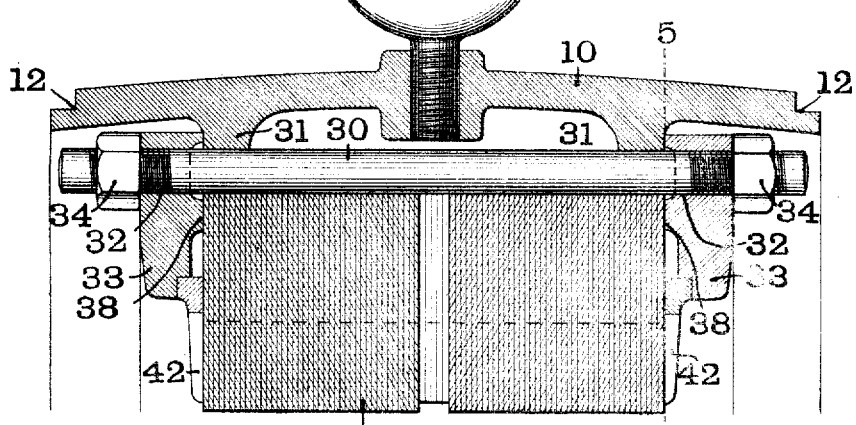

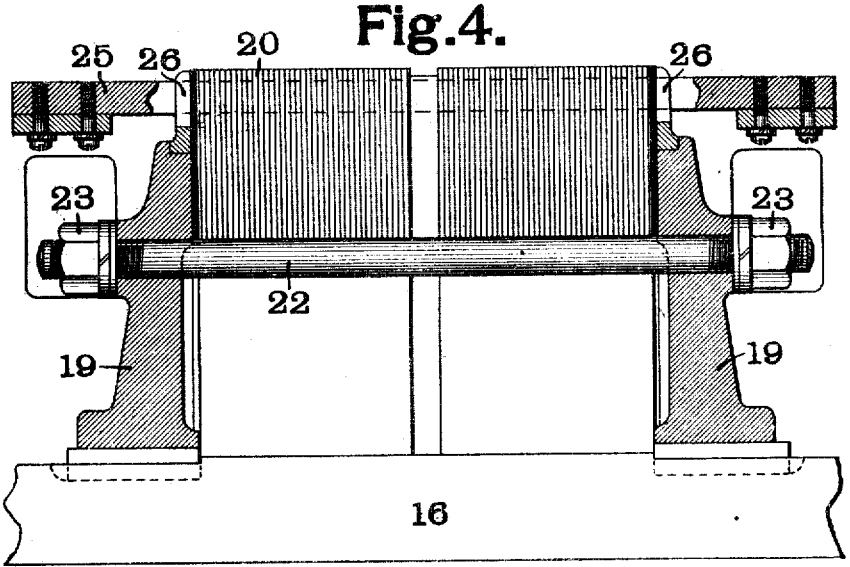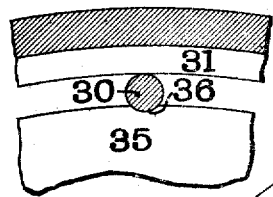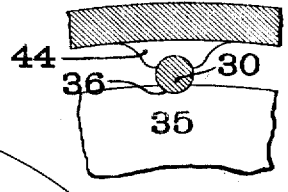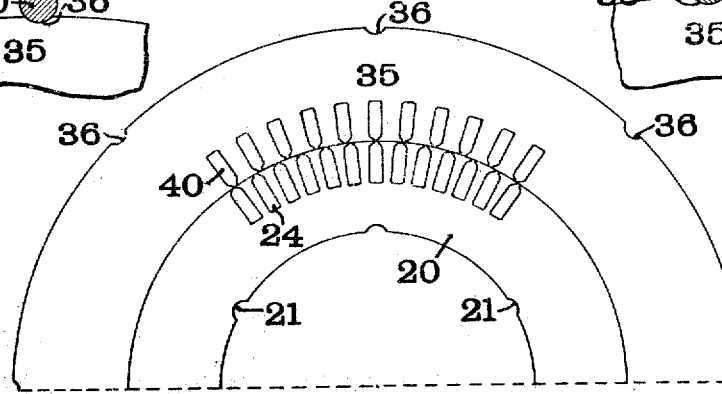

ARTHUR H. TIMMERMAN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

No. 921,914.  Specification of Letters Patent.  Patented May 18, 1909.

Application filed November 5, 1906. Serial No. 342,004.

*To all whom it may concern:*

Be it known that I, ARTHUR H. TIMMERMAN, a citizen of the United States, residing at the city of St. Louis, in the State of Missouri, have invented certain new and useful Improvements in Dynamo - Electric Machines, of which the following is such a full, clear, and exact description as will enable any one skilled in the art to which it appertains to make and use the same, reference being had to the accompanying drawings, forming part of this specification.

My invention relates to improvements in dynamo electric machines and has for its object the provision of simple and reliable means for accurately centering the laminæ forming the cores for both the field or stator and the armature or rotor of such machines.

In the accompanying drawings which illustrate a dynamo electric machine made in accordance with my invention, Figure 1 is a side view partly in elevation and partly in section. Fig. 2 is an enlarged section showing the manner of securing the field core. Fig. 3 is a view similar to Fig. 2 but showing a slight modification. Fig. 4 is an enlarged sectional view showing the manner of securing the armature core. Fig. 5 is a section on the line 5—5 of Fig. 3. Fig. 6 is a view similar to Fig. 5 but showing a slight modification, and Fig. 7 is a view showing the manner of forming the laminæ for the cores.

Like marks of reference refer to similar parts in the several views of the drawings.

While I have shown my invention as applied to the Wagner type of single phase alternating current motors, it will be understood that it may be applied to various types of both direct and alternating current motors, as well as generators. 10 represents the main or central part of the motor casing. This part 10 is provided with a suitable base 11 and carries the field magnet, as will be hereinafter described. Each end of the central part 10 of the casing is finished as shown at 12 so as to receive the end caps 13. These end caps 13 are secured in position by means of bolts 14 and are provided with bearings 15 in which is journaled the armature shaft 16.

Mounted on the shaft 16 is a commutator 17 and the slip rings 18, such as are usual in this type of motor. The shaft 16 also has keyed to it a pair of end plates 19 between which are secured the annular laminæ 20 forming the armature core. These laminæ 20 have formed on their inner peripheries notches 21 adapted to engage bolts 22 passing through end plates 19 and provided with nuts 23 for holding the said end plates firmly against the laminæ 20. The laminæ 20 have formed in them notches 24 which when the laminæ are assembled form passages for the armature winding 25. Placed between the outer edges of the end plates 19 and the laminæ 20 are annular members 26 having fingers projecting between the notches 24 so as to reinforce the outer edges of the armature core. Projecting inwardly from the central part 10 of the casing, near one end thereof, is a flange 28, best shown in Fig. 2. This flange 28 is provided with holes 29 forming bearings for bolts 30 for securing the field core in position. These holes 29 are accurately positioned with reference to the center of the part 10, this being accomplished by means of a suitable jig coöperating with the finished ends 12 of the said part 10. At the opposite end of the central part 10 of the casing is a narrow flange 31 also projecting inwardly from the casing. This flange 31 forms bearings against which the bolts 30 rest, the inner face of said flange being accurately finished concentric with the finished end 12 of the central part 10 of the casing. The bolt 30 at this end of the casing passes through openings 32 in a clamping ring 33 and is held in position by means of nuts 34.

35 are the annular laminæ forming the field core. Each lamina 35 is provided on its outer periphery with notches 36 adapted to engage the bolts 30 and thus center the lamina. The laminæ are clamped between a ridge 37 on the flange 28 and a ridge 38 on the clamping ring 33. The laminæ 36 are also provided with notches 40, which, when the laminæ are assembled, form slots for the passage of the field windings 41. Between the flange 28 and the clamping ring 33 and the laminæ 30 are annular members 42 provided with fingers projecting between the slots 40 so as to reinforce the inner edge of the core. In Fig. 3 I have shown a slight modification in which the flange 28 at the left hand end of the central part 10 of the casing is dispensed with, and the arrangement at the left hand end is a duplicate of that shown at the right hand end of the said part 10 of the casing.

In Fig. 6 I have shown a further modification in which the flange 31 is replaced by a series of lugs 44 forming bearings against which the bolts 30 rest. These lugs 44 perform the same function as the flange 41 and in effect form an interrupted flange in place of the solid flange; and I wish, therefore, when I use the term "flange" in claims, to be understood as including such an interrupted flange.

In forming the laminæ 20 and 35 for the cores of my machine, the two are punched from a single sheet of metal at the same time, as illustrated in Fig. 7, the notches 21 and 36 and the slots 24 and 40 being formed at the same time. The two parts are therefore concentric and the various laminæ forming both cores will remain concentric if the notches 21 and 36 are maintained in line at the proper distances from the armature shaft. This is accomplished in the armature by means of the bolts 20 being accurately spaced from the center of the disks 19. In the field core the same result is accomplished by means of the bolts 31, as the holes 29 and the bearing face of the flange 31 are accurately located with relation to the center of the machine. In assembling the laminæ 35 of the field core, the bolts 30 are first passed through the holes 29, one of the nuts 34 being removed from each bolt. The laminæ 35 can then be placed in position, as the arrangement of the flange 31 is such as to readily allow the passage of the said laminæ, as shown in Figs. 5 and 6. When the modification shown in Fig. 3 is used, the laminæ may be inserted from either end of the part 10, while with that shown in Fig. 2 they can only be inserted from the right hand end. By tightening the nuts 34 the laminæ are firmly clamped in position between the flange 28 and the clamping ring 33, or between the two clamping rings, as shown in Fig. 3. The bolts 30 thus clamp the laminæ 35 in position and center them as well.

Having fully described my invention, what I claim as new and desire to secure by Letters Patent of the United States, is—

1. In a dynamo electric machine, the combination with a casing having finished ends, of inwardly projecting flanges integral with the casing and provided with bearings for transverse bolts positioned with definite relation to said ends, bolts positioned by said bearings, field laminæ bearing against and centered by said bolts, end caps secured to said finished ends, and a rotor supported by said end caps.

2. In a dynamo electric machine, the combination with a casing having finished ends, of inwardly projecting flanges integral with said casing and provided with bearings for transverse bolts positioned with definite relation to said ends, bolts positioned by said bearings, field laminæ bearing against and centered by said bolts, a clamping ring for said laminæ secured by said bolts, end caps secured to said finished ends, and a rotor supported by said end caps.

3. In a dynamo electric machine, the combination with a casing having an annular central part adapted to receive end caps, of an inwardly extending flange at each end of said central part and integral therewith, one of said flanges being arranged to allow the passage of the laminæ, field laminæ bearing against the other of said flanges, transverse bolts positioned by said flanges and centering said laminæ, a clamping ring for said laminæ secured by said bolts, end caps secured to said central part, and a rotor supported by said end caps.

4. In a dynamo electric machine, the combination with a casing having an annular central part adapted to receive end caps, of an inwardly extending flange at each end of said central part and integral therewith, one of said flanges being arranged to allow the passage of the laminæ, field laminæ bearing against the other of said flanges, transverse bolts positioned by said flanges and centering said laminæ, a clamping ring for said laminæ secured by said bolts and bearing against said first flange, end caps secured to said central part, and a rotor supported by said end caps.

5. In a dynamo electric machine, the combination with a casing having an annular central part provided with finished ends to receive end caps, of an inwardly extending flange at each end of said central part integral therewith and provided with transverse bolt bearings positioned with definite relation to said finished ends, one of said flanges being arranged to allow the passage of the laminæ, field laminæ bearing against the other of said flanges, transverse bolts positioned by said flanges and centering said laminæ, a clamping ring for said laminæ secured by said bolts, end caps secured to said finished ends, and a rotor supported by said end caps.

6. In a dynamo electric machine, the combination with a casing having an annular central part provided with finished ends to receive end caps, of an inwardly extending flange at each end of said central part integral therewith and provided with transverse bolt bearings positioned with definite relation to said finished ends, one of said flanges being arranged to allow the passage of the laminæ, field laminæ bearing against the other of said flanges, transverse bolts positioned by said flanges and centering said laminæ, a clamping ring for said laminæ secured by said bolts and bearing against said first flange, end caps secured to said finished ends, and a rotor supported by said end caps.

7. In a dynamo electric machine, the combination with a casing provided with a central part adapted to receive end caps, of an inwardly extending flange arranged at one end of said central part integral therewith and provided with holes forming bolt bearings, a second inwardly extending flange also integral with said central part and arranged to allow the passage of the laminæ and situated at the other end of said central part and forming bearings against which the bolts are adapted to rest, transverse bolts positioned by said bearings, annular laminæ having notches in their peripheries engaging said bolts, and a clamping ring secured by said bolts and coöperating with said first named flange to hold said laminæ, end caps secured to said central part, and a rotor supported by said end caps.

8. In a dynamo electric machine, the combination with the central part of a casing, of end caps carried by said central part, a rotor shaft journaled in said end caps, an inwardly extending flange arranged at one end of said central part integral therewith and provided with holes forming bolt bearings, a second inwardly extending flange also integral with said central part and arranged to allow the passage of the laminæ and situated at the other end of said central part and forming bearings against which the bolts are adapted to rest, transverse bolts positioned by said bearings, annular laminæ having notches in their peripheries engaging said bolts, a clamping ring secured by said bolts and coöperating with said first-named flange to hold said laminæ, end pieces carried by said rotor shaft, bolts carried by said end pieces, and annular laminæ the inner peripheries of which bear against said bolts, said end pieces being clamped against said laminæ by said bolts.

In testimony whereof, I have hereunto set my hand and affixed my seal in the presence of the two subscribing witnesses.

ARTHUR H. TIMMERMAN. [L. S.]

Witnesses:
JAMES H. BRYSON,
W. A. LAYMAN.